(No Model.)
J. SUYDAM.
SYRINGE.
No. 324,429. Patented Aug. 18, 1885.
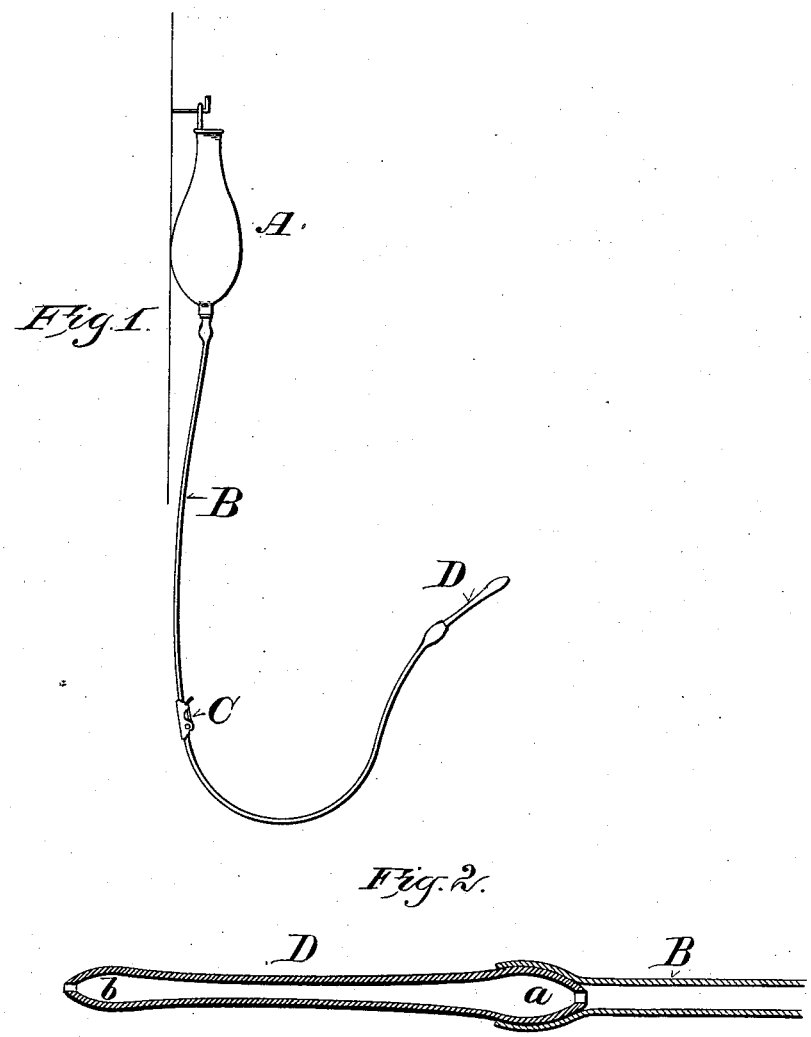
Witnesses:
Chas. L. Goss.
George Goll
Inventor.
James Suydam,
By C. H. Bottum
Attorney.

UNITED STATES PATENT OFFICE.

JAMES SUYDAM, OF MILWAUKEE, WISCONSIN.

SYRINGE.

SPECIFICATION forming part of Letters Patent No. 324,429, dated August 18, 1885.

Application filed April 27, 1885. (No model.)

*To all whom it may concern:*

Be it known that I, JAMES SUYDAM, of Milwaukee, in the county of Milwaukee and State of Wisconsin, have invented certain new and useful Improvements in Reversible Syringe-Tubes; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates particularly to that class of syringes in which the tubes are connected with a small rubber hose or pipe.

It consists, essentially, of a reversible syringe-tube having a larger and smaller end, both adapted for injection purposes, and its objects are, first, to lessen the number of parts, and, second, to diminish the cost of manufacture of a complete syringe.

In the accompanying drawings, Figure 1 is a side elevation of a fountain-syringe with one of my improved tubes, and Fig. 2 is a longitudinal medial section, on a greatly enlarged scale, of the tube shown in Fig. 1.

A represents the rubber sack or reservoir of a fountain-syringe of the usual style and construction. B is a long rubber hose connected with said sack A at the base, and provided with a shut-off or valve, C, by which the flow of liquid from said sack and through said hose is controlled. These syringes are provided with the usual assortment of tubes commonly employed for the various purposes to which syringes are applied. The various tubes are interchangeable, and are preferably formed of hard rubber, although any other suitable material may be used.

As heretofore constructed each tube has been formed with one end of suitable shape for the particular purpose to which it is to be applied, and provided at the other end with a shoulder or enlargement for the purpose of attaching it to and retaining it in the end of the rubber hose B, as seen in the drawings. The end of the tubes having this latter shoulder or enlargement for the purpose of attachment to the hose B is unsuitable and inoperative for the purposes for which the other end is designed.

The trade in this class of goods demands, among the various tubes usually accompanying a syringe, one of small size for injection purposes. To supply this demand, a separate tube has heretofore been made, thereby materially increasing the cost of the complete syringe.

To meet the above demand, I provide the tube D, having a larger end, $a$, and a smaller end, $b$, both suitably formed for injections. Each of said ends being enlarged, serves not only its particular purpose, as above stated, but also for attaching the tube to the syringe and retaining it in the end of the hose B. By thus forming both the larger end $a$ and smaller end $b$ on a single tube, D, one of the otherwise essential parts is dispensed with, and the cost of the complete syringe is reduced.

For the purpose of illustration, I have shown and described my improved tube in connection with a fountain-syringe, although it is equally applicable to other forms in which the attachment of the tube is effected by inserting it into an elastic opening.

Having thus described my invention, what I claim as new, and desire to secure by Letters Patent, is—

As a new article of manufacture, a reversible syringe-tube having the larger rounded injection end $a$ and the smaller rounded injection end $b$, each of said ends adapted to be inserted into and retained in an elastic opening, substantially as and for the purposes set forth.

In testimony that I claim the foregoing as my own I affix my signature in presence of two witnesses.

JAMES SUYDAM.

Witnesses:
E. H. POTTONN,
CHAS. L. GOSS.